(12) United States Patent
Snavely et al.

(10) Patent No.: US 12,523,578 B2
(45) Date of Patent: Jan. 13, 2026

(54) SOIL RESPIRATION DEVICE, A SYSTEM HAVING SUCH DEVICES, AND METHODS OF USING THE SYSTEMS

(71) Applicants: Jason R. Snavely, Bloomsburg, PA (US); Rick L. Haney, Salado, TX (US)

(72) Inventors: Jason R. Snavely, Bloomsburg, PA (US); Rick L. Haney, Salado, TX (US)

(73) Assignees: Jason R. Snavely, Bloomsburg, PA (US); Rick L. Haney, Salado, TX (US)

( * ) Notice: Subject to any disclaimer, the term of this patent is extended or adjusted under 35 U.S.C. 154(b) by 528 days.

(21) Appl. No.: 17/867,994

(22) Filed: Jul. 19, 2022

(65) Prior Publication Data
US 2023/0013716 A1  Jan. 19, 2023

Related U.S. Application Data

(60) Provisional application No. 63/223,303, filed on Jul. 19, 2021.

(51) Int. Cl.
*G01N 1/22* (2006.01)
*G01N 21/61* (2006.01)

(52) U.S. Cl.
CPC ......... *G01N 1/2294* (2013.01); *G01N 1/2205* (2013.01); *G01N 21/61* (2013.01)

(58) Field of Classification Search
None
See application file for complete search history.

(56) References Cited

U.S. PATENT DOCUMENTS 2,386,832 A * 10/1945 Zaikowsky .......... G01N 1/2294
 436/32
5,010,776 A * 4/1991 Lucero .................... B09B 1/00
 73/863.23

(Continued)

FOREIGN PATENT DOCUMENTS

CN  105842180 A  *  8/2016  ............. G01N 21/31
CN  111239362 A  *  6/2020  ............. G01N 33/24

(Continued)

OTHER PUBLICATIONS

Haney, R. L. et al., "Estimating Soil Carbon, Nitrogen, and Phosphorus Mineralization from Short-Term Carbon Dioxide Respiration", Communications in Soil Science and Plant Analysis, vol. 39, 2008, pp. 2706-2720.*

(Continued)

*Primary Examiner* — Daniel S Larkin
(74) *Attorney, Agent, or Firm* — The Webb Law Firm

(57) ABSTRACT

A device for monitoring soil health conditions includes (i) a gas intake tube and (ii) a detachable cap. The gas intake tube includes: a first closed end; a second open end opposite the first end; and a body portion extending between the first closed end and the second open end, where the body portion includes a housing and a plurality of holes that extend around the body portion in which the plurality of holes allow gases to enter the housing. The gas intake tube has a length extending from the first closed end to the second open end of greater than 5 inches, and the plurality of holes are within at least 1.5 inches of the first closed end. Further, the detachable cap is connected to the second open end of the gas intake tube and has a gas dispersing slot. A system and method are also included.

16 Claims, 5 Drawing Sheets

(56) References Cited

U.S. PATENT DOCUMENTS

| | | | |
|---|---|---|---|
| 6,598,458 B1* | 7/2003 | Edwards | G01N 1/2294 73/19.1 |
| 7,520,186 B2* | 4/2009 | Risk | G01N 33/24 73/864.74 |
| 8,466,799 B2* | 6/2013 | Kim | G01N 33/004 250/343 |
| 8,712,692 B2* | 4/2014 | Risk | G01N 1/2294 73/23.32 |
| 2002/0000226 A1* | 1/2002 | Butnor | G01N 33/497 702/19 |
| 2009/0301234 A1* | 12/2009 | Risk | G01N 1/2294 73/864.83 |
| 2012/0035850 A1 | 2/2012 | Risk et al. | |
| 2013/0291622 A1* | 11/2013 | Heinemeyer | G01N 33/0004 73/23.2 |
| 2019/0285608 A1 | 9/2019 | Laird et al. | |
| 2019/0353631 A1 | 11/2019 | Koshnick et al. | |
| 2023/0085819 A1* | 3/2023 | Herring | G01N 33/24 73/38 |

FOREIGN PATENT DOCUMENTS

| | | | | |
|---|---|---|---|---|
| CN | 111239363 A | * | 6/2020 | |
| CN | 112414793 A | * | 2/2021 | G01N 1/2294 |
| SU | 1305599 A1 | * | 4/1987 | |

OTHER PUBLICATIONS

Haney, R. L. et al., "The Soil Health Tool—Theory and Initial Broad-Scale Application", Applied Soil Ecology, vol. 125, 2018, pp. 162-168.*

Soil respiration, https://en.wikipedia.org/wiki/Soil_respiration, Jun. 11, 2020.

Soil Quality for Environmental Health, http://soilquality.org/indicators/respiration, Jun. 11, 2020.

* cited by examiner

SOIL RESPIRATION DEVICE, A SYSTEM HAVING SUCH DEVICES, AND METHODS OF USING THE SYSTEMS

CROSS REFERENCE TO RELATED APPLICATIONS

This application claims priority to U.S. Provisional Patent Application No. 63/223,303 filed Jul. 19, 2021, which is incorporated by reference herein.

BACKGROUND OF THE INVENTION

Field of the Invention

The present invention relates to a device for evaluating and assessing soil health conditions, systems containing such devices, and methods of using the systems to evaluate soil and manage treatment of the soil.

Description of Related Art

Current methods for evaluating soil typically involve obtaining a soil sample, sending the sample to a lab, and then testing the soil for nutrients. These methods are clearly time-consuming and expensive. While in-field devices and methods have been developed, these devices and methods are complex and costly. For instance, these devices consist of a complex arrangement of pumps, tubes, sensors, image systems, shields, probes, transmitters, and mounting poles. Long-term data of using these devices have also shown that farmers and growers are over fertilizing their crop fields with synthetic nitrogen to accomplish lofty crop yield goals, which ultimately results in ecosystem degradation. Thus, it is desirable to provide a device and system for evaluating and assessing soil health conditions in real-time that are inexpensive, easy to implement, repeatable, and which help to accurately manage treatment of the soil.

SUMMARY OF THE INVENTION

In one embodiment according to the present invention, a device for monitoring soil health conditions that includes (i) a gas intake tube and (ii) a detachable cap. The gas intake tube comprises: a first closed end; a second open end opposite the first end; and a body portion extending between the first closed end and the second open end, where the body portion comprises a housing and a plurality of holes that extend around the body portion in which the plurality of holes allow gases to enter the housing. The gas intake tube has a length extending from the first closed end to the second open end of greater than five inches, and the plurality of holes are within at least 1.5 inches of the first closed end. Further, the detachable cap is connected to the second open end of the gas intake tube, the detachable cap comprising a gas dispersing slot configured to receive and attach to a first end of a conduit.

In certain non-limiting embodiments, the gas intake tube has a length extending from the first closed end to the second open end of at least six inches. The gas intake tube can also have a diameter of greater than two inches.

In some non-limiting embodiments, the plurality of holes are positioned in a circular and staggered pattern around the gas intake tube. In addition, the plurality of holes can each independently have a diameter within a range of from $\frac{1}{16}$ to $\frac{5}{16}$ of an inch, or a diameter of about $\frac{3}{16}$ of an inch. Further, the plurality of holes can comprise at least 15 holes. The gas intake tube and detachable cap can also be made of a plastic material.

In certain non-limiting embodiments, the present invention is directed to a system for evaluating soil health conditions in real-time and managing a treatment of the soil. The system can include: (a) a device for monitoring soil health conditions as previously described and in further detail herein; (b) an analysis container comprising a carbon dioxide sensor; (c) one or more conduits fluidly connecting the device for monitoring soil health conditions to the analysis container; (d) a controller in operable communication with the analysis container; and (e) one or more computer-readable storage mediums in operable communication with the controller.

In some non-limiting embodiments, at least one of the one or more conduits further comprise a filter. The carbon dioxide sensor can include various sensors, such as for example, a nondispersive infrared carbon dioxide sensor. To promote the flow of gas from the gas intake tube and into the analysis container, the system can further include a pump.

In certain non-limiting embodiments, the one or more computer-readable storage mediums contain programming instructions that, when executed, can cause the controller to determine an amount of nitrogen, carbon, or both present in the soil. In some non-limiting embodiments, the one or more computer-readable storage mediums contain programming instructions that, when executed, can further cause the controller to determine an amount of fertilizer to be added to the soil.

The present also relates to a method of evaluating soil health conditions in real-time. The method can include: positioning a device for monitoring soil health conditions as previously described and described in further detail herein; allowing gas from the soil to enter the device through the plurality of holes and flow into an analysis container comprising a carbon dioxide sensor; determining an amount of carbon dioxide in the soil; and determining an amount of one or more additional compounds in the soil based on the amount of carbon dioxide measured in real-time.

In certain non-limiting embodiments, the device for monitoring soil health conditions in real-time is placed into the soil in which the plurality of holes are four to six inches within the depth of soil found in the ground. The gas from the soil can flow from the device to the analysis container by way of one or more conduits to the analysis container.

In some non-limiting embodiments, determining the amount of one or more additional compounds in the soil comprises determining an amount of nitrogen, carbon, or both in the soil based on the amount of carbon dioxide measured in real-time. The method can further include determining a treatment program of the soil based on the amount of nitrogen, carbon, or both in the soil.

DESCRIPTION OF THE INVENTION

Figure 1:
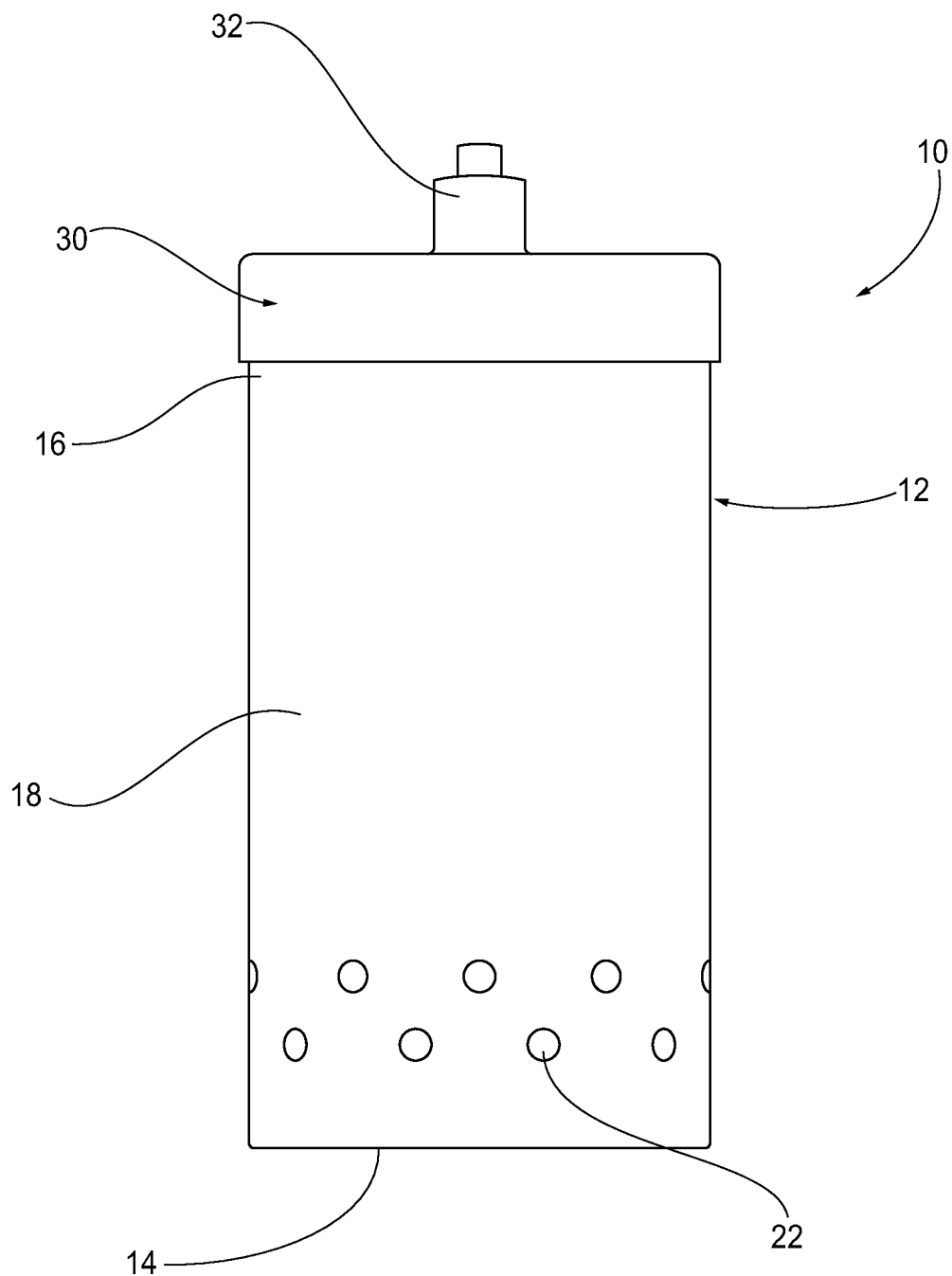
FIG. 1 is a front view of a device for monitoring soil health conditions according to the present invention.

For purposes of the description hereinafter, the terms "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume alternative variations and step sequences, except where expressly specified to the contrary. It is also to be understood that the specific devices and processes illustrated in the attached drawings, and described in the specification, are simply exemplary embodiments of the invention. Hence, specific dimensions and other physical characteristics related to the embodiments disclosed herein are not to be considered as limiting.

Also, it should be understood that any numerical range recited herein is intended to include all sub-ranges subsumed therein. For example, a range of "one to ten" is intended to include all sub-ranges between (and including) the recited minimum value of one and the recited maximum value of ten, that is, having a minimum value equal to or greater than one and a maximum value of equal to or less than ten.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

Figure 2:
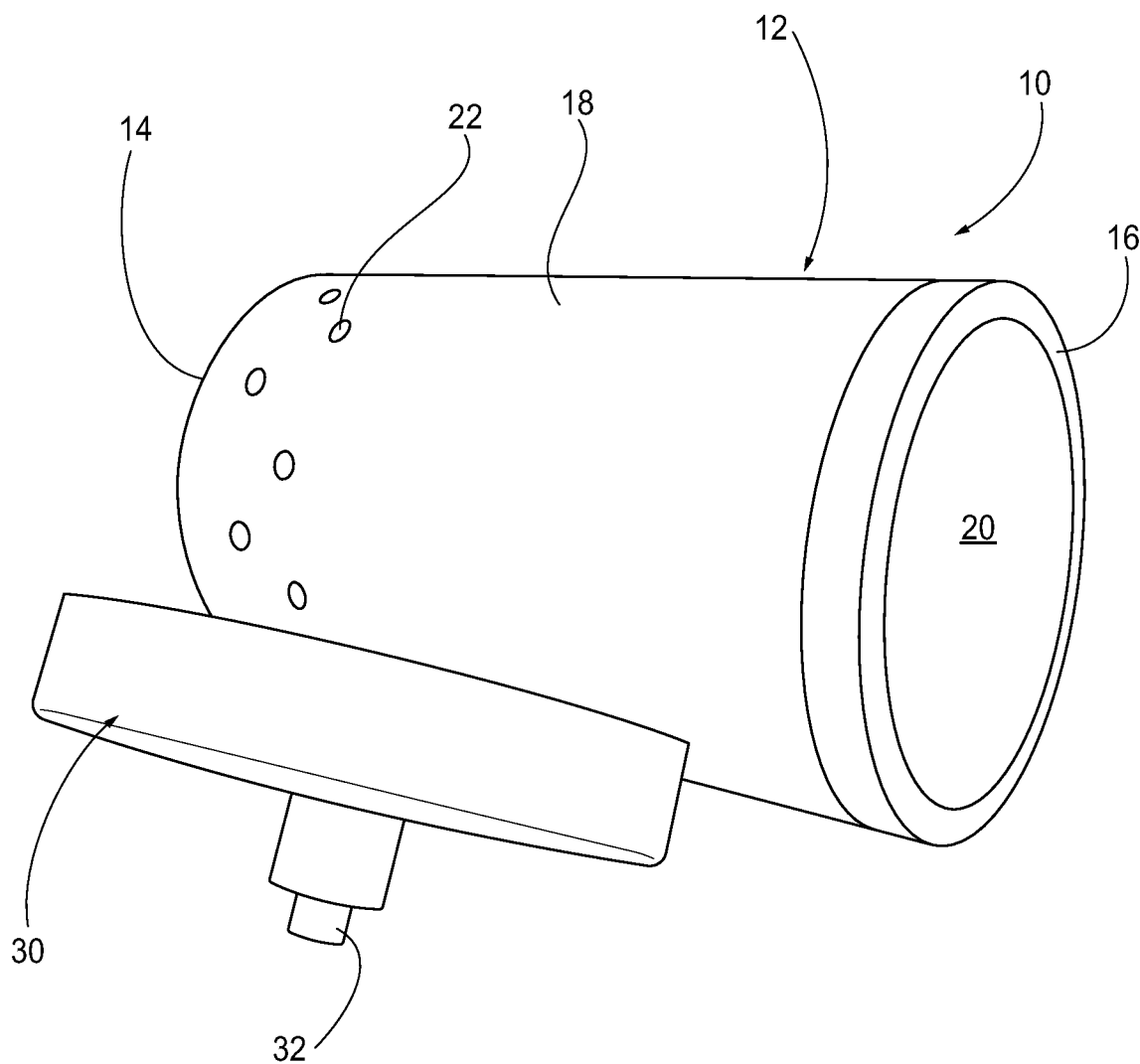
FIG. 2 is a perspective view of the device for monitoring soil health conditions shown in FIG. 1 and with the cap detached from the tube.

As indicated, and referring to FIGS. 1-2, the present invention includes a device 10 for monitoring soil health conditions. As further shown in FIGS. 1-2, the device 10 includes a gas intake tube 12. As used herein, "a gas intake tube" refers to a tube that is able to receive at least gases (e.g., carbon dioxide) from the surrounding environment (e.g., gases in the soil).

The gas intake tube 12 can have various shapes including, for example, a cylindrical shape, a square shape, and the like. The gas intake tube 12 can also be formed from various types of materials, such as plastic, metal, or a combination thereof. It is appreciated that the material used to form the gas intake tube 12 is selected to withstand conditions of the environment it is placed in without substantial corrosion, physical damage, and the like. In one non-limiting example, the gas intake tube is formed from polyvinyl chloride (PVC).

In certain non-limiting embodiments, as shown in FIGS. 1-2, the gas intake tube 12 comprises a first closed end 14, a second open end 16 opposite the first end 14, and a body portion 18 extending between the first closed end 14 and the second open end 16. The first closed end 14 is closed such that gases, liquids, solids, and any other material do not enter through the first closed end 14 of the gas intake tube 12. As shown in FIG. 2, the second open end 16 is at least partially opened (i.e. only partially opened or completely opened) as desired and as described in further detail herein.

In certain non-limiting embodiments, and referring to FIGS. 1-2, the body portion 18 of the gas intake tube 12 comprises a housing 20 and a plurality of holes 22 that extend around the body portion 18. The holes 22 are designed to allow gases, such as carbon dioxide, to enter the housing 20 of the body portion 18. In some non-limiting embodiments, the holes 22 can be positioned in a circular and staggered pattern around the gas intake tube 12. For instance, and as shown in FIG. 1, the holes 22 can be staggered around the gas intake tube 12 such that every other hole 22 is aligned with each other in a circular pattern around the body portion 18. In certain non-limiting embodiments, the gas intake tube 12 comprises at least 15, at least 18, or up to 20 holes 22.

The holes 22 positioned around the gas intake tube 12 are also sized and shaped to control the flow rate and amount of gas that enters the housing 20. This controls the gas entering the housing 20 and allows the gas to sufficiently flow through the gas intake tube 12 in a manner that reflects the current gas exchange within the soil. The size of the holes 22 also prevents large amounts of soil from entering the housing 20 of the tube 12. In some non-limiting embodiments, the holes 22 each independently have a diameter within a range of from $1/16$ to $5/16$ of an inch, or within a range of from $2/1$ to $4/16$ of an inch, or about (+/−5%) $3/16$ of an inch. The plurality of holes 22 can also be positioned within a particular distance from the first closed end 14 such as, for example, within at least 1.5 inches of the first closed end 14.

It is appreciated that the gas intake tube 12 is sized and shaped to be positioned within the soil to receive the desired gas flow through the gas intake tube 12 that helps mimic the gas, and in particular carbon dioxide, currently in the soil. For example, the gas intake tube 12 can have a length extending from the first closed end 14 to the second open end 16 of greater than five inches, or greater than five and a half inches, or at least six inches, such as about (+/− five %) six inches. The gas intake tube 12 can also have a diameter of greater than two inches, and a circumference of about (+/− five %) three inches, such as three inches. It is appreciated that the housing 20 can also be sized and shaped to provide the desired gas flow through the gas intake tube 12 that helps mimic the gas currently in the soil.

As shown in FIG. 1, the device 10 for monitoring soil health conditions further includes a detachable cap 30 connected to the second open end 16 of the gas intake tube 12. The detachable cap 30 can be attached to the second open end 16 using various configurations such as by threading the cap 30 over or into the second open end 16, snapping the cap 30 onto the second open end 16, and the like. The detachable cap 30 can have various sizes such as, for example, having the same diameter as the gas intake tube 12 or, alternatively, the detachable cap 30 can have a wider diameter than the diameter of the gas intake tube 12. The detachable cap 30 can also be formed from the same or different materials as the gas intake tube 12 previously described.

Figure 3:
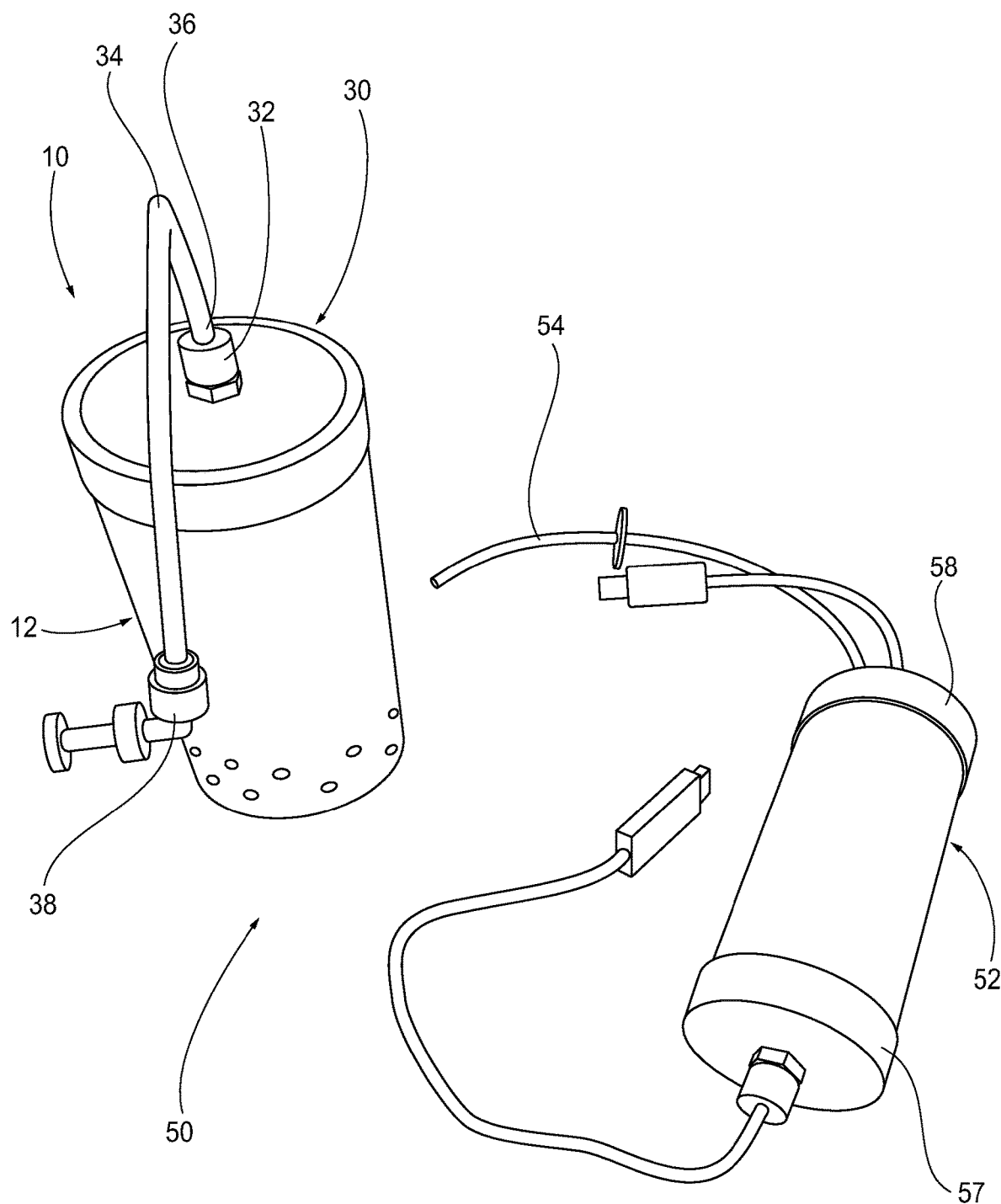
FIG. 3 is a perspective view of a system for evaluating soil health conditions in real-time and managing a treatment of the soil.

As further shown in FIGS. 1-3, the detachable cap 30 has a gas dispersing slot 32 that is configured to connect to a conduct 34 (see FIG. 3), such as a flexible plastic tube, where the gas from the soil flows into as it exits the gas intake tube 12. The gas dispersing slot 32 can have various configurations provided that the slot 32 can connect to a conduit 34 to disperse the gas out of the gas intake tube 12. For example, the slot 32 can comprise a hole directly formed in the cap 30, or the slot 32 can be formed on a nipple configuration that extends out from the cap 30.

The present invention is also directed to a system 50 for evaluating soil health conditions in real-time and managing a treatment of the soil. As used herein, "real-time" refers to a level of responsiveness from a controller that a user senses as sufficiently immediate or that enables a controller to keep up with an external process. The system 50 of the present invention can therefore provide sufficiently immediate information regarding the conditions of the soil as well as enabling one to manage treatment of the soil immediately based on this information.

As shown in FIG. 3, the system 50 includes the device 10 for monitoring soil health conditions previously described. The system 50 further includes the conduit 34 for transferring the gas out of the gas intake tube 12. Referring to FIG. 3, the first end 36 of the conduit 34 is attached to the detachable cap 30 and the second end 38 can be attached to an analysis container 52 that comprises a carbon dioxide sensor 56 (see FIG. 4) positioned within the container 52. It is appreciated that the analysis container 52 can have a separate conduit 54, such as a plastic tube, that attaches to the second end 38 of conduit 34 associated with the device 10 for monitoring soil health conditions (for example through a tube connector), as shown in FIG. 3. Alternatively, a single conduit 34 can extend between the cap 30 of device 10 and the analysis container 52.

As indicated, the analysis container 52 comprises a carbon dioxide sensor 56 (see FIG. 4) positioned within the container 52. For example, and referring to FIGS. 4 and 5, the analysis container 52 can have separate detachable caps 57 and 58 positioned at opposite ends of the container 52 in which at least one of the caps 57 includes a operable connection and communication pathway system 59 to the carbon dioxide sensor 56. A non-limiting example of a carbon dioxide sensor is a nondispersive infrared carbon dioxide sensor.

Figure 4:
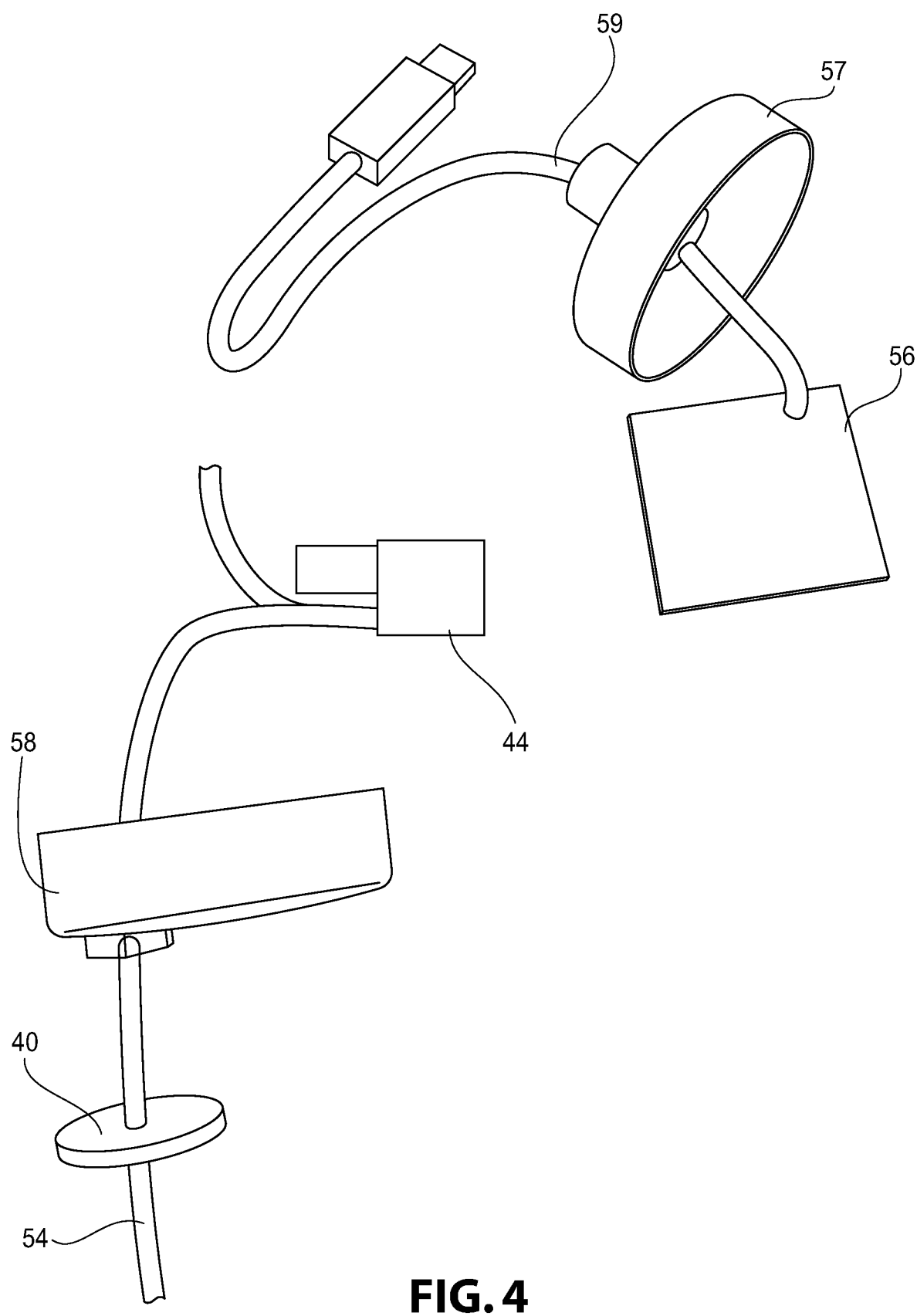
FIG. 4 is a perspective view of a detached caps of an analysis container and various components attached thereto.
Figure 5:
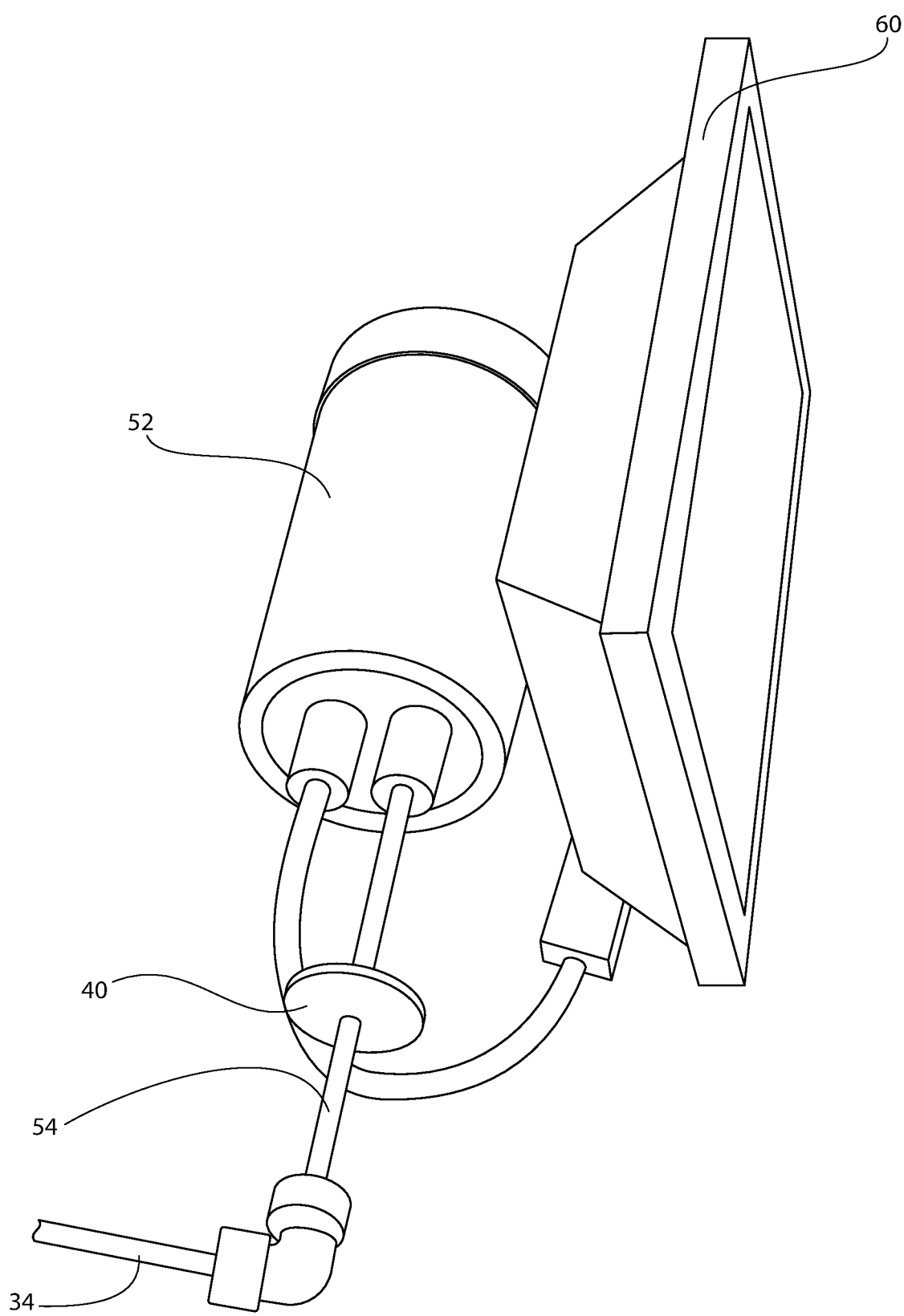
FIG. 5 is a perspective view of a portion of a system for evaluating soil health conditions in real-time and managing a treatment of the soil with an analysis container attached to a controller.

Referring to FIGS. 4-5, conduit 34 and/or 54 can comprise a filter 40. The filter 40 can be used to remove water and moisture flowing with the gas through the conduit 34 to prevent water/moisture from interfering with the carbon dioxide analysis. To promote the flow of gas from the gas intake tube 12 to the analysis container 52, a pump 44 can be attached to conduit 54 (see FIG. 4) and/or conduit 34.

As shown in FIG. 5, the system 50 also includes a controller 60 that is in operable communication with the analysis container 52 so that carbon dioxide measurements and other data gathered, and/or determined by the analysis container 52, can be transferred or accessed by the controller 60. It is appreciated that controller 60 may include one or more microprocessors, CPUs, and/or other computing devices. One or more computer-readable storage mediums are also in operable communication with the controller 60. The computer-readable storage mediums can contain programming instructions that, when executed, cause the controller 60 to perform multiple tasks. This includes programming algorithms such as those described herein that allow the controller 60 to determine the condition of the soil and for determining treatment based on the soil health condition and desired use of the soil (e.g., fertilization and addition of nitrogen or other chemicals for particular crops). The programming instructions can be updated and modified for different types of analysis.

In certain non-limiting examples, the programming instructions include, for example, algorithms that allow the controller 60 to determine the amount of nitrogen, carbon, and/or oxygen in the soil. For instance, the programming instructions can include algorithms that allow the controller 60 to determine the amount of nitrogen and carbon in the soil based on the carbon dioxide measurements.

In addition, the programming instructions can also include, for example, algorithms that allow the controller 60 to determine treatment of the soil based on the conditions previously determined. For instance, the programming instructions can include algorithms that allow the controller 60 to determine the amount of fertilizer and other chemicals that should be added to the soil based on the carbon dioxide measurements and/or the determined amount of nitrogen and carbon.

The present invention further includes a method of evaluating soil health conditions in real-time. The method includes positioning the previously described gas intake tube 12 into the ground such that the gas intake tube 12 is placed into the soil. As indicated, the gas intake tube 12 is sized and shaped to be positioned within the soil to receive the desired gas flow into and through the gas intake tube 12 that helps mimic the gas, and in particular carbon dioxide, currently in the soil. For example, the gas intake tube 12 can have a length to allow the holes 22 of the tube 12 to be four to six inches, such as four and a half to five and a half or four to five inches, within the depth of the soil. It was found that this distance exhibits the gas exchange of carbon dioxide and uptake of oxygen representative of the current soil health conditions. It is appreciated that various tools can be used to dig the hole in the soil before placing the gas intake tube 12 into the soil.

After placing the gas intake tube 12 into the soil, the method includes allowing gas (e.g., carbon dioxide) to enter the tube 12 through the holes 22. The gas will then flow through the tube 12 up to the cap 30 where it enters the conduit 34 and eventually the analysis container 52, such as through conduit 54. The gas intake tube 12 can be used to continuously obtain the changing gas conditions in the soil for continuous analysis of the soil in the analysis container 52.

Once the gas is transferred to the analysis container 52, the method further includes determining the conditions in the soil and optionally potential treatment of the soil using the controller 60 and computer readable mediums. For instance, the method can include determining the amount of carbon dioxide in the soil. The method can also include determining one or more additional elements or chemicals in the soil, such as nitrogen, carbon, oxygen, and the like, based on the carbon dioxide analysis. As such, the computer-readable storage mediums can contain programming instructions that, when executed, cause the controller 60 to determine the amount of nitrogen, carbon, and/or oxygen in the soil based on the carbon dioxide measurements.

In addition, the method can also include determining treatment of the soil. This step can utilize programming instructions, for example, algorithms that allow the controller 60 to determine treatment of the soil based on the conditions previously determined. For instance, the programming instructions can include algorithms that determine fertilization and other chemicals that should be added to the soil based on the types of crops intended to be produced and carbon dioxide determined in real-time as well as the determined nitrogen and carbon in the soil.

It was found that the previously described system 50 and corresponding method can be used to estimate microbial activity and root respiration in the soil in real-time, which allows one to manage soil health in a simplified and real-time fashion. For example, the system 50 and corresponding method can reveal the impact of rainfall and estimate nitrogen availability in both wet and dry conditions, which in turn allows one to determine the proper treatment of the soil.

Whereas particular embodiments of this invention have been described above for purposes of illustration, it will be evident to those skilled in the art that numerous variations of the details of the present invention may be made without departing from the invention as defined in the appended claims.

The invention claimed is:

1. A device for monitoring soil health conditions comprising:

(i) a gas intake tube comprising:
a first closed end;
a second open end opposite the first end; and
a body portion extending between the first closed end and the second open end, the body portion comprising a housing and a plurality of holes that extend around an entire circumference of the body portion with a staggered pattern around the gas intake tube in which the plurality of holes allow gases to enter the housing, wherein the plurality of holes comprise at least fifteen holes and are sized and shaped to control the flow rate and amount of gas that enters the housing and prevent an amount of soil entering the housing through the holes,
wherein the gas intake tube has a length extending from the first closed end to the second open end of greater than five inches, and wherein the plurality of holes are within at least 1.5 inches of the first closed end; and
(ii) a detachable cap connected to the second open end of the gas intake tube, the detachable cap comprising a gas dispersing slot configured to receive and attach to a first end of a conduit.

2. The device of claim 1, wherein the gas intake tube has a length extending from the first closed end to the second open end of at least six inches.

3. The device of claim 1, wherein the gas intake tube has a diameter of greater than two inches.

4. The device of claim 1, wherein the plurality of holes each independently have a diameter within a range of from $1/16$ to $5/16$ of an inch.

5. The device of claim 1, wherein the plurality of holes each independently have a diameter of about $3/16$ of an inch.

6. The device of claim 1, wherein the gas intake tube and detachable cap are both made of a plastic material.

7. A system for evaluating soil health conditions in real-time and managing a treatment of the soil, the system comprising:
(a) a device for monitoring soil health conditions according to claim 1;
(b) an analysis container comprising a carbon dioxide sensor;
(c) one or more conduits fluidly connecting the device for monitoring soil health conditions to the analysis container;
(d) a controller in operable communication with the analysis container; and
(e) one or more computer-readable storage mediums in operable communication with the controller.

8. The system of claim 7, wherein at least one of the one or more conduits further comprise a filter.

9. The system of claim 7, wherein the carbon dioxide sensor is a nondispersive infrared carbon dioxide sensor.

10. The system of claim 7, further comprising a pump that promotes the flow of gas from the gas intake tube and into the analysis container.

11. The system of claim 7, wherein the one or more computer-readable storage mediums contain programming instructions that, when executed, cause the controller to determine an amount of nitrogen, carbon, or both present in the soil.

12. The system of claim 7, wherein the one or more computer-readable storage mediums contain programming instructions that, when executed, cause the controller to determine an amount of fertilizer to be added to the soil.

13. A method of evaluating soil health conditions in real-time, the method comprising:
positioning a device for monitoring soil health conditions according to claim 1 into the ground;
allowing gas from the soil to enter the device through the plurality of holes and flow into an analysis container comprising a carbon dioxide sensor;
determining an amount of carbon dioxide in the soil; and
determining an amount of nitrogen, carbon, or both in the soil based on the amount of carbon dioxide measured in real-time.

14. The method of claim 13, wherein the device for monitoring soil health conditions is placed into the soil in which the plurality of holes are four to six inches within the depth of soil found in the ground.

15. The method of claim 13, wherein the gas from the soil flows from the device to the analysis container by way of one or more conduits.

16. The method of claim 13, further comprising determining a treatment program of the soil based on the amount of nitrogen, carbon, or both in the soil.

\* \* \* \* \*